United States Patent [19]
Melber et al.

[11] Patent Number: 6,090,284
[45] Date of Patent: Jul. 18, 2000

[54] UNDERDRAIN UNIT FOR GRANULAR FILTRATION SYSTEM

[75] Inventors: Milton R. Melber; Gary D. Haggard, both of Austin, Tex.

[73] Assignee: Enviroquip, Inc., Austin, Tex.

[21] Appl. No.: 09/170,870

[22] Filed: Oct. 13, 1998

[51] Int. Cl.⁷ .................................................. B01D 24/46
[52] U.S. Cl. ........................ 210/274; 210/275; 210/293
[58] Field of Search ................................... 210/274, 275, 210/279, 289, 291, 293, 541

[56] References Cited

U.S. PATENT DOCUMENTS

| | | | |
|---|---|---|---|
| 3,468,422 | 9/1969 | Camp | 210/274 |
| 4,331,542 | 5/1982 | Emrie | 210/289 |
| 5,019,259 | 5/1991 | Hambley | 210/293 |
| 5,156,738 | 10/1992 | Maxson | 210/289 |
| 5,332,497 | 7/1994 | Shea et al. | 210/289 |
| 5,865,999 | 2/1999 | Shea et al. | 210/541 |

*Primary Examiner*—Ivars Cintins
*Attorney, Agent, or Firm*—Thomas M. Freiburger

[57] ABSTRACT

An underdrain unit of the type having air and water backwash for backflushing a granular filtration system has improved retention structure for retaining folded, perforated stainless steel underdrain plates against the floor of the tank drain. The retention structure is in the form of hollow horizontal tubes which not only hold the folded plates in place but also serve to deliver backwashing air. Thus, instead of air delivery tubes being mounted above a series of brackets that hold the folded plates in place against the floor, the air delivery in the system of the invention is via the same structural element which retains the folded plates. Embodiments are described for gravel bed systems and for sand filter systems.

11 Claims, 5 Drawing Sheets

PRIOR ART

UNDERDRAIN UNIT FOR GRANULAR FILTRATION SYSTEM

BACKGROUND OF THE INVENTION

This invention is concerned with an underdrain for use with a granular filtration system, and more particularly, the invention relates to such an underdrain fitted with air and water backwash systems, and to an improvement in the air scouring system and the structure of the underdrain unit itself.

U.S. Pat. No. 4,331,542, assigned to the assignee of the present invention, describes an underdrain system for use with a gravity-fed granular filtration system, and one which is fitted with water backflushing and air scouring. The present invention is directed at an improvement over the underdrain system and air scouring subsystem described in that patent, as well as over other similar systems. U.S. Pat. No. 4,331,542 is incorporated herein by reference.

As described and shown in U.S. Pat. No. 4,331,542, high rate gravity filters typically include a filter bed of particulate filter material, usually gravel of varying sizes. Liquid from the tank or vessel flows downwardly through the filter medium and exits the filtration tank through openings in an underdrain structure which supports the filter medium. The medium may include different sizes of gravel, the coarsest at the bottom, against the underdrain structure, and the gravel decreasing in size up to the finest gravel or sand located at the top of the filter bed. Some beds are all sand. Such a filter bed may be covered with finely granulated anthracite coal or other types of filter material.

Gravity filters of this type usually are cleaned by backwashing, which may include a backflow of water or a combination of air (or gas) and water passed through the filter bed in the opposite direction of normal filtration. Uniform distribution of the backwashing water and the accompanying air, if included, is a goal of most underdrain structures. This includes the system described in the above-referenced patent, as well as some of the underdrain systems of the following patents: U.S. Pat. Nos. 4,659,462, 4,707,257, 5,015,383, 5,019,259, 5,156,738, 5,160,614, 5,269,920, 5,332,497, 5,462,664, 5,489,388, 5,512,174, 5,639,384.

A shortcoming of the prior underdrain systems, including that of U.S. Pat. No. 4,331,542, is inefficiency in structure of the underdrain unit, as to cost, bulk, number of parts and installation; and positioning of the air scouring or backflushing system at an elevation that is relatively high within the granular medium, such that lower portions of the granular medium are not well served by the scouring air, making backwashing less thorough or less efficient.

U.S. Pat. Nos. 5,545,358 and 5,526,620 are also pertinent to the subject matter of this invention, in describing tank covers in which structural elements of the covers serve as air or gas delivery or withdrawal conduits.

SUMMARY OF THE INVENTION

In the granular filter underdrain system of the invention, the underdrain structural support and air distribution system are improved and made more efficient by combining them into one structural element. As compared to the system shown in U.S. Pat. No. 4,331,542, which has folded plates forming generally V-shaped troughs and interior spaces, the structural arrangement of the invention saves material, reduces installation time, saves cost and locates the air discharge at a lower position in the tank, i.e. in the V-shaped trough, therefore allowing the total height of filter bed often to be reduced.

A single structural member, namely a tubular member, serves both as an underdrain clamp device to hold the underdrain structure down to the floor, and as an air duct. Preferably square or rectangular in shape, the tubular structural member functions as an underdrain clamp with greater rigidity for a given wall thickness than the channel-shaped clamp used in the '542 patent referenced above. The tubular member is quite rigid and is capable of spanning over a gullet area of the drain floor with less chance of deflection.

In a preferred embodiment the wall thickness of the air conducting, underdrain-retaining structural tube is reduced, and sealing is improved, by use of a tube insert which is installed vertically in the tubular member around each of a series of anchor bolts that draw the tube structure downwardly against the underdrain, which is thus held against the tank floor. The anchor bolt thus bears against the tube insert, avoiding deflection of the structural tube walls.

Air orifices can be located at a low location on one or preferably both sides of the tubular structural member, thus placing the scouring air outlets at a very low position near the bottom of the bed of granular filter material.

It is accordingly among the objects of the invention to improve the efficiency of an underdrain structure for a granular filtration system, by combining the functions of structural underdrain retention and scouring air distribution in a single structural member, providing the advantages outlined above. These and other objects, advantages and features of the invention will be apparent from the following description of a preferred embodiment, considered along with the accompanying drawings.

DESCRIPTION OF PREFERRED EMBODIMENTS

Figure 1:
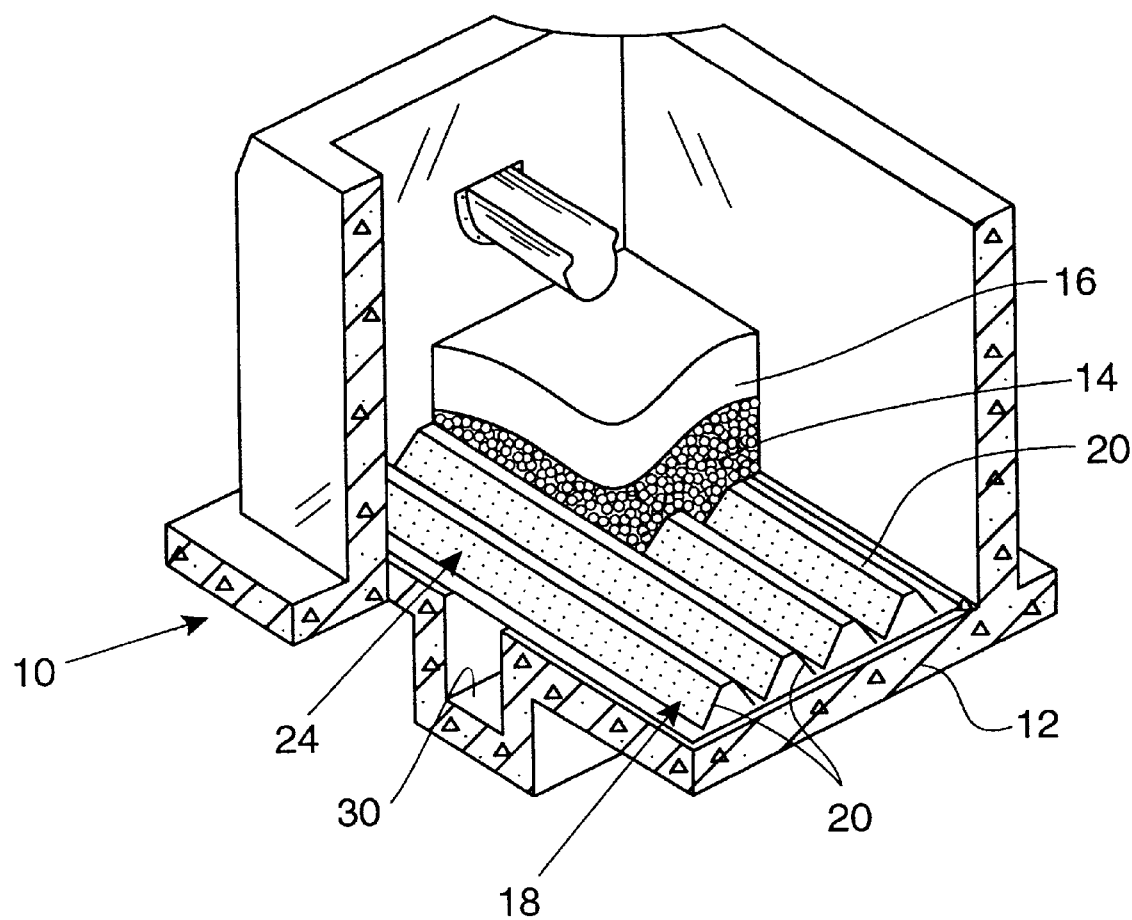
FIG. 1 is a perspective view showing a granular filtration system including an underdrain structure of the type to which this invention relates.
Figure 2:
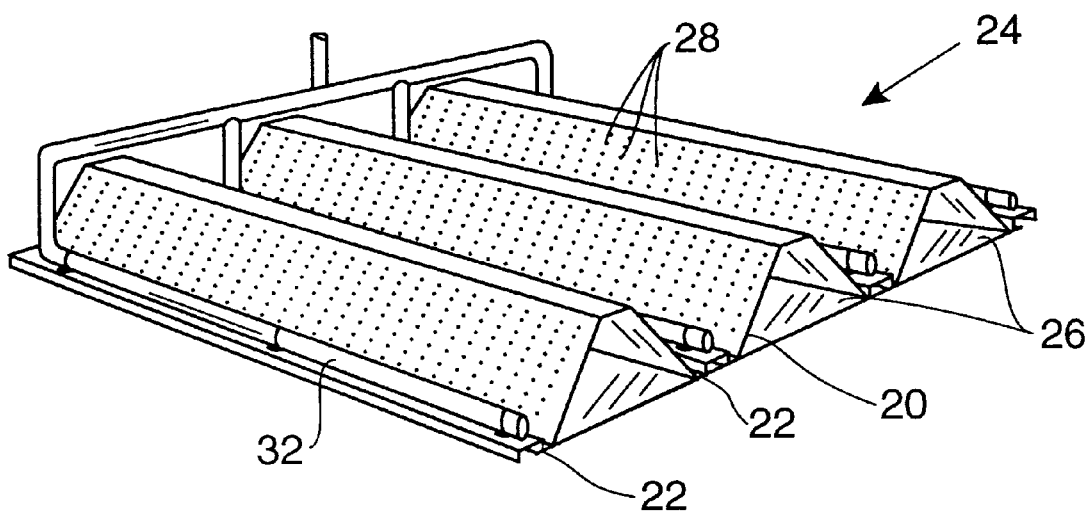
FIG. 2 is a perspective view showing in greater detail an underdrain unit of the type shown in FIG. 1, but with an air scour subsystem formed in accordance with prior art.

In the drawings, FIG. 1 shows in perspective major components of a liquid filtration system 10 in accordance with prior art and also in accordance with features of the invention to be described below. The filtration system is formed as part of a tank typically of concrete and having a floor 12. This is a system of the type described in U.S. Pat. No. 4,331,542, as well as some of the other patents referenced above. The filtration system, as described above and also in the '542 patent, has a bed of granular material 14 which may be topped with a layer of bituminous material 16. Supporting the granular bed 14 is a perforated surface 18 at the bottom of the tank, preferably a corrugated surface as shown and as described in the '542 patent. Such a surface preferably is formed of a series of perforated longitudinal ribs 20 which form triangular or trapezoidal cross-sectional shapes when placed against the floor 12 as seen in FIGS. 1 and 2. In a preferred embodiment, as shown particularly in FIGS. 2 and 3, each perforated longitudinal rib 20 preferably has a horizontal flange 22 at left and right extremities, these flanges of adjacent longitudinal ribs being slightly spaced apart in the completed underdrain unit 24 (see FIGS. 2 and 3), thus defining troughs of the corrugations which are partly constituted by the tank floor 12 itself. As explained in U.S. Pat. No. 4,331,542, the longitudinal ribs define inner spaces or chambers 26 which collect liquid filtrate passing through the granular bed 14 and through the multiplicity of perforations 28 in the ribs. This filtrate travels to and collects in a gutter or gullet 30 of the tank bottom.

Figure 3:
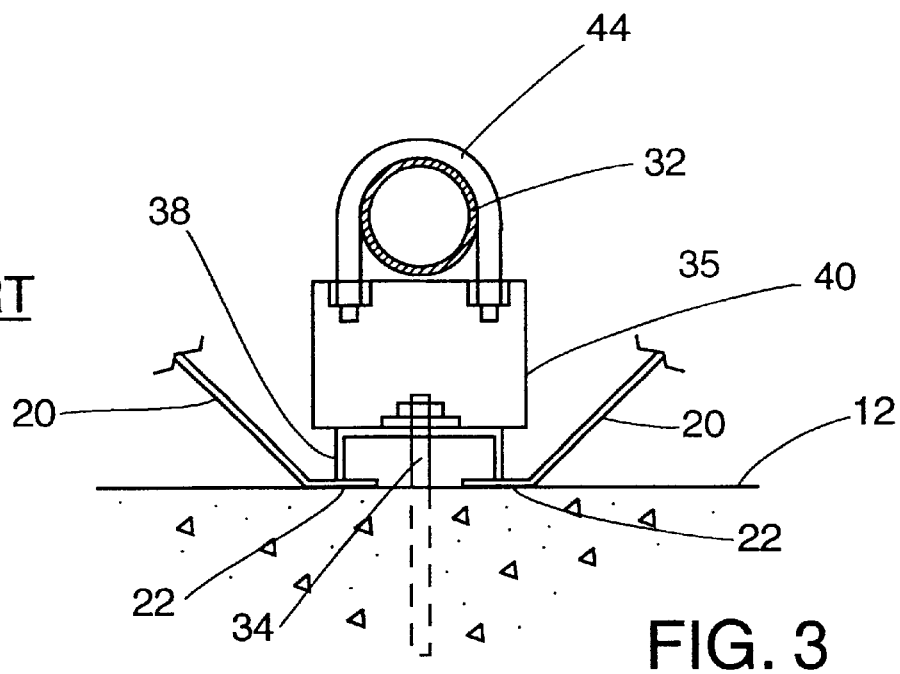
FIG. 3 is a sectional elevation view showing a portion of a prior art air delivery system such as in FIG. 2.

As noted above, granular filtration systems and underdrain units of this general type are ordinarily equipped with liquid backwashing subsystems, and also pressurized air (or gas), sometimes called scouring air, which is delivered adjacent to the underdrain perforations and to the backwashing liquid to aid in the backwashing of debris from the filter bed. FIGS. 2 and 3 show one arrangement for an air scour subsystem wherein air is delivered generally near the bottom of the corrugation troughs 35 through air delivery tubes 32, retained within the system in a particular way as described in U.S. Pat. No. 4,331,542.

The views of FIGS. 2 and 3 show the use of anchor bolts 34 in the troughs 35 between adjacent perforated longitudinal ribs 20, portions of adjacent such ribs being shown in FIG. 3. These anchor bolts in the prior art arrangement were used to tighten down a channel 38 in each trough, the channel having flanges which bore down against the edge flanges 22 of the adjacent longitudinal ribs. These anchor bolts also served to fix in place intermittently spaced brackets 40, each of which in some embodiments was Z-shaped in edge view (viewed from the left or right with reference to FIG. 3). The '542 patent shows a slightly different arrangement, with a different type of bracket fixed by the anchor bolt above the channel 38. In either case, a gas delivery tube 32 was in turn fixed in place to the top of the bracket 40, which could be by U bolts 44 as shown. The gas distribution tubes 32 typically were stainless steel or PVC, 2½ inch diameter, with 3/16 inch holes in the tube every six inches for the release of scouring gas (usually air). In the '542 patent the holes in the air distribution pipes are shown in the top sides of the pipes.

With the frequent exception of the air tubes or pipes 32, all of the components of the prior art system shown in FIGS. 2 and 3 were typically stainless steel.

As explained above, besides requiring excess hardware and assembly, the described prior system for anchoring the underdrain structures and for supporting air scouring distribution pipes also placed the scouring air outlets at a relatively high elevation within the granular filter bed 14. The lowest air injection point in the prior system depicted was about four inches from the tank bottom (in a system where each longitudinal rib 20 was about eleven inches wide overall and six inches tall). This effectively wasted about one-third of the typical twelve inches of gravel of the filter bed. As a result, the scouring air was less effective in helping backwash the granular material of clogging debris, even in combination with the movement of the backwashing liquid.

Figure 4:
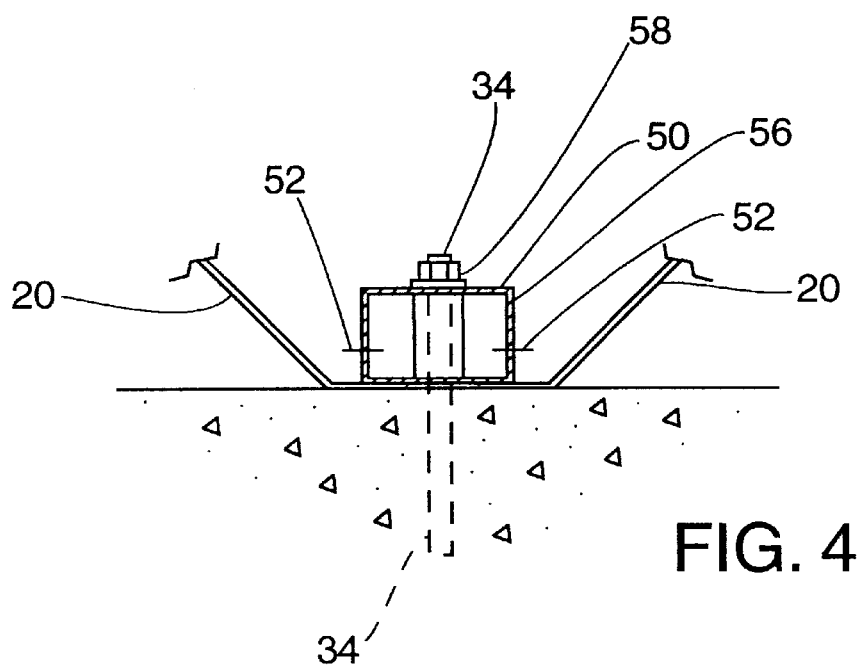
FIG. 4 is a sectional elevation view showing a portion of a system according to the invention for delivering backwash or scouring air.

The system of this invention for retaining underdrain structures in place against the tank floor and for distributing scouring air is shown in the cross-sectional view of FIG. 4, which can be directly compared to FIG. 3. The principle of the invention is to use a tubular structural member, which may be a rectangular stainless steel tube 50, as a structural member to clamp down the underdrain components and also as a conduit for air distribution. Air distribution outlet holes or slits are shown at 52 in FIG. 4, and these may be located as frequently as desired, e.g. about every six inches on opposite sides of the tube. Efficient air scouring has been found to occur in filter media when the air is introduced at a low level on the stainless steel tube, such as about one inch above the tank floor, although other heights such as within about two or two and one-half inches above the floor can be efficient in some applications. The tube 50 in one embodiment is about two inches high by three inches wide.

As shown in FIG. 4, an anchor bolt 34 penetrates directly through the tube 50, the anchor bolts being at desired intervals such as about two feet. Gaskets may be included against the top of the tube and against the bottom of the tube to provide air tight seals when pressure is brought against these tube surfaces by the anchor bolt and the floor. However, to enable dependable and durable seals and to enable the rectangular tube to be of lighter material, the assembly preferably includes a stiffener insert 56, which may be a simple tubular collar having a length approximately the same as the height of the structural tubing member 50 as shown. The use of this insert enables the nut 58 on the anchor bolt to be tightened down firmly without deflecting the tube's surfaces, and it actually helps rigidify the whole assembly. In one preferred arrangement the stiffener insert is of about 16 gauge steel and is installed through holes in top and bottom of the tubing member, of diameter slightly larger than the O.D. of the insert. The insert is welded in place around each hole, sealing the tubing member and avoiding need for gaskets. The internal stiffener 56 was found to allow the use of 16 gauge (0.062 inch) stainless steel in the rectangular tubular structural member 50, rather than a 3/16 inch thick wall or greater, which would be required if effective seals were to be made with gaskets and without the stiffening spacer. This assumes dimensions of a preferred embodiment as referenced above.

When using all 304 stainless steel components for the entire air scour system of the invention, the cost is approximately 30% less than the cost of components in the prior system described above, considering only materials. In addition, installation cost is approximately 20% less.

Figure 5:
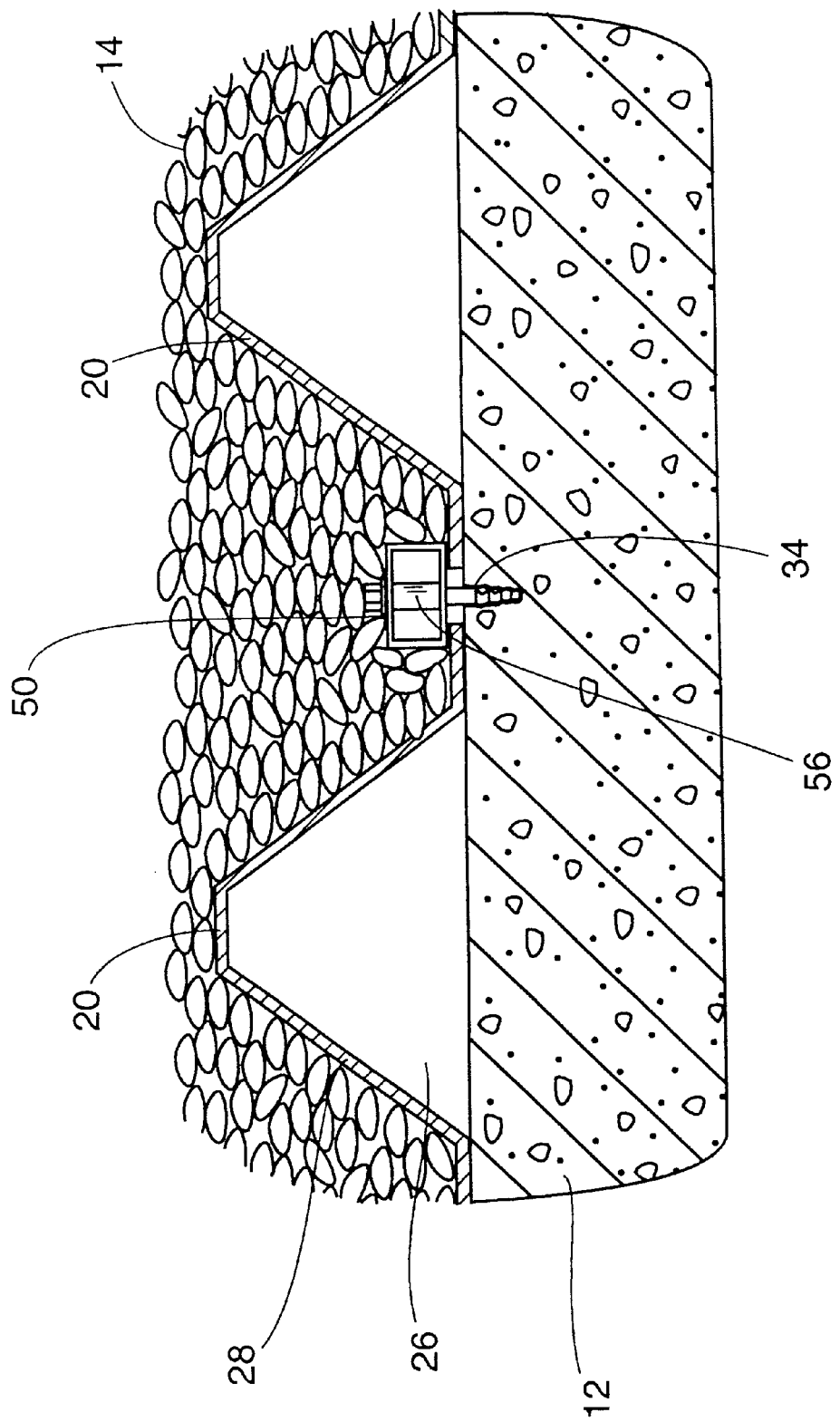
FIG. 5 is a sectional elevation view showing a portion of the system of the invention, and more fully indicating its environment in a granular filtration system.
Figure 6:
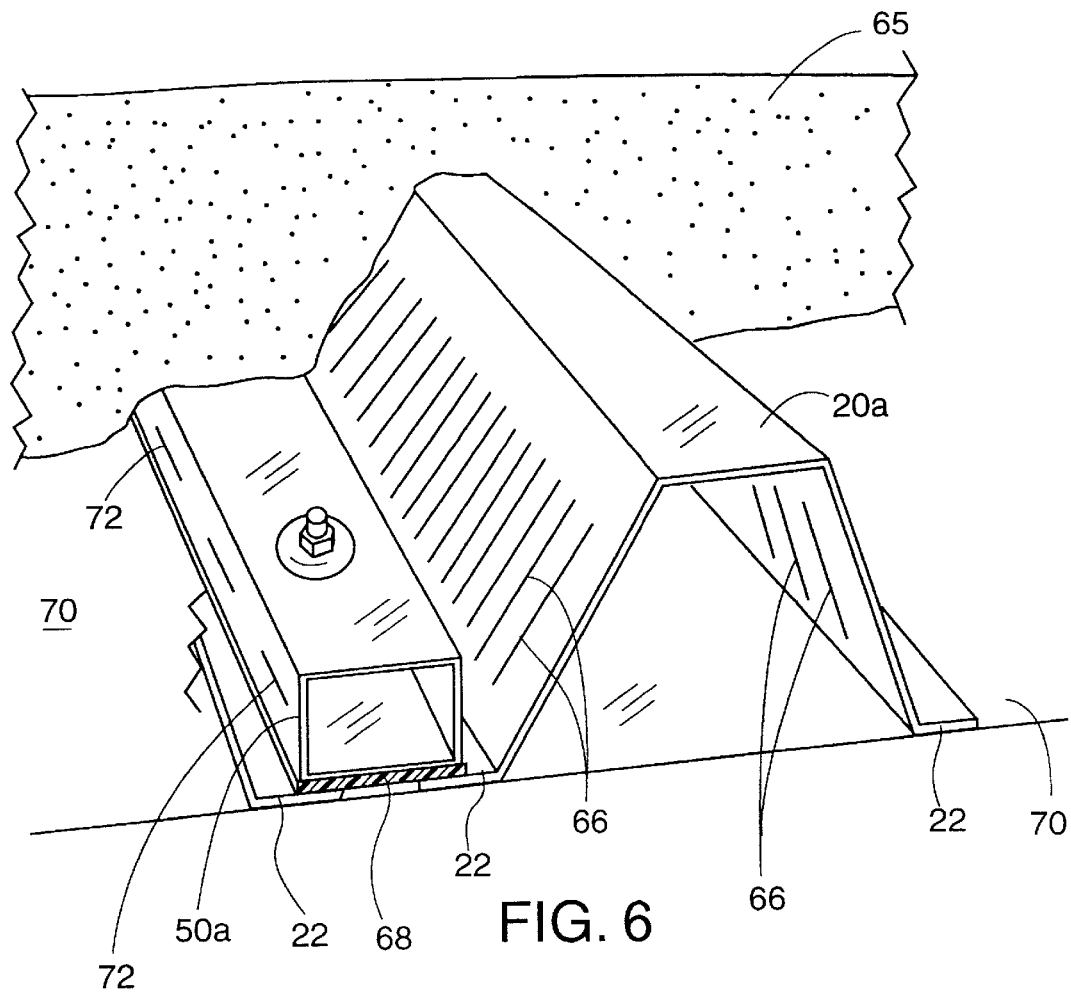
FIG. 6 is a partially sectioned, broken away perspective view showing a system according to another embodiment of the invention.

FIG. 5 shows the assembly of the invention in cross section, with two of the elongated, perforated longitudinal ribs 20 side-by-side, held down by the structural tubular member 50, with an anchor bolt 34 shown. In FIG. 5 the granular material 14 is shown as gravel, and this bed of material is not fully revealed, since there are normally layers of finer gravel above the gravel shown, with sand and possibly bituminous or other filter material above. FIG. 6 shows a similar system, but with the granular material comprising a bed of sand 65. Again, further filter material such as bituminous material (not shown) may lie on top of the bed of sand.

In this form of the system an elongated perforated longitudinal rib 20a has a series of narrow slits 66, rather than holes. These slits 66 are smaller than the smallest grains of sand 65, thus enabling water to pass into the interior of the trapezoidal longitudinal rib 20a, without passing sand. Again, a structural tubing member 50a, similar to the member 50 above, is used to hold down edge flanges 22 of the slitted drain member 20a. An edge flange 22 of an adjacent underdrain member 20a is indicated in FIG. 6, but without the remainder of the underdrain component, and the structural tubing member 50a is shown bearing down on that edge flange as well.

In this case the tubing member bears indirectly against the edge flanges 22, with a neoprene or other elastomeric, rubbery gasket strip 68 interposed between the tubing member and the flanges 22, as well as the floor 70. The gasket strip 68 thus makes a seal between the edge flanges 22 and the floor 70, preventing sand from entering the interior of the underdrain structure 20a.

In this embodiment, the structural tubing member, which acts as a scouring air delivery tube, preferably has slits 72 for delivering the air. These slits, like the slits 66 in the underdrain structure, are small enough to prevent the passage of sand grains or other fine filter medium. The characterization of the tubular structural member 50 or 50a as being engaged against the underdrain structure, which in turn is then engaged against the tank floor, is to be interpreted to include arrangements wherein a gasket such as the gasket 68 is included or excluded, whether the gasket be above or below the edge flanges 22.

Although the invention is described and shown with generally trapezoid-shaped underdrain structures comprising discrete longitudinal ribs which are connected only when clamped down to the tank floor, these ribs can be in different shapes, and, although the discrete ribs are preferred, they can comprise a single unitary structure. The discrete ribs can be rounded or generally half-cylindrical or other generally convex shapes, or the unitary structure can be similar to that depicted in the drawings but integral, or an undulating sine-wave type unitary structure. The shape of the tubular structural conduit which holds the underdrain to the floor can be reshaped accordingly. The advantages of the invention are more fully realized with the discrete longitudinal ribs as described above, since the structural tubing member 50 lies continuously along the edge flanges of these members 50 to clamp them to the floor on a continuous basis, whereas a unitary underdrain structure would actually require somewhat less retention structure for holding it to the floor.

The above described preferred embodiments are intended to illustrate the principles of the invention, but not to limit its scope. Other embodiments and variations to this preferred embodiment will be apparent to those skilled in the art and may be made without departing from the spirit and scope of the invention as defined in the following claims.

We claim:

1. An underdrain unit in a granular filtration system having a bed of granular material positioned over a tank floor and through which liquid is filtered to pass toward a tank outlet below the underdrain unit, and wherein a backflushing system is provided for backflushing the granular filter by liquid and gas scouring, comprising:

perforated underdrain structure adjacent to the tank floor and covering an outlet drain area of the tank floor and defining an interior space downstream of the perforations for outflow of filtrate by gravity, the underdrain structure being positioned to support a granular medium comprising a bed of granular filtering material, and the underdrain structure defining generally an undulating shape over the tank floor with parallel, repeated convex longitudinal portions between which are elongated troughs, retention structure retaining the perforated underdrain structure to the tank floor, comprising tubular structural members extending longitudinally, in the troughs of the undulating underdrain structure, and each tubular member having gas exit perforations at spaced locations along its length, anchor means securing the tubular member to the tank floor and tightened so as to engage the tubular member against the underdrain structure within said trough and to hold the underdrain structure securely against the tank floor, and a gas delivery system including pressurized gas conduits connected to the tubular members for delivering pressurized gas to the tubular members for gas scouring of the granular medium during backflushing of the medium.

2. The apparatus of claim 1, wherein the anchor means comprises anchor bolts passing vertically through the tubular member and engaged in the tank floor.

3. The apparatus of claim 1, wherein the perforated underdrain structure comprises a series of discrete elongated perforated sections, separate from and non-integral with one another, each having a convex, raised center and a pair of opposed lateral bottom flanges positioned to engage against the tank floor, the tubular structural member being generally rectangular and engaging down against the flanges of adjacent discrete elongated perforated sections to secure the elongated perforated sections to the tank floor.

4. The apparatus of claim 3, wherein the elongated perforated sections each is in a generally trapezoid shape and with lateral flanges at left and right, the convex, raised center of each elongated perforated section having two ascending and converging walls and a flat top portion between the walls.

5. The apparatus of claim 1, wherein the tubular structural member is generally rectangular in cross section and wherein the anchor means comprises a series of anchor bolts at spaced longitudinal locations on the tubular structural member, and including stiffeners surrounding each anchor bolt and positioned to reinforce the tubular structural member against deformation when the anchor bolts are tightened.

6. The apparatus of claim 5, wherein each tubular structural member has an opening at top and bottom surrounding the anchor bolt, within which the stiffener is inserted, the stiffener being welded to the top and bottom surfaces of the tubular structural member so as to seal the interior of the tubular structural member against interchange of gas or liquid to or from the exterior of the tubular structural member.

7. The apparatus of claim 1, wherein the perforations in the tubular structural members and in the underdrain structure comprise narrow slits small enough to prevent the passage of sand, in a filtration system wherein sand is the granular material.

8. The apparatus of claim 7, further including a rubbery, elastomeric cushion positioned between each tubular structural member and the underdrain structure, to and in contact with the tank floor, to prevent fine granular medium material from passing to the interior space of the underdrain structure.

9. The apparatus of claim 1, wherein the gas exit perforations are located in left and right side walls of the tubular structural members, less than two inches above the tank floor.

10. The apparatus of claim 1, wherein the gas exit perforations are located in left and right side walls of the tubular structural members, less than one inch above the tank floor.

11. The apparatus of claim 1, wherein the gas exit perforations comprise narrow slits formed in sides of the tubular member, small enough to prevent passage of sand.

* * * * *